G. W. BEACH & C. VON CULIN.
CONTROL FOR DIRIGIBLE HEADLIGHTS AND THE LIKE.
APPLICATION FILED OCT. 30, 1916.
1,234,265.
Patented July 24, 1917.
2 SHEETS—SHEET 2.
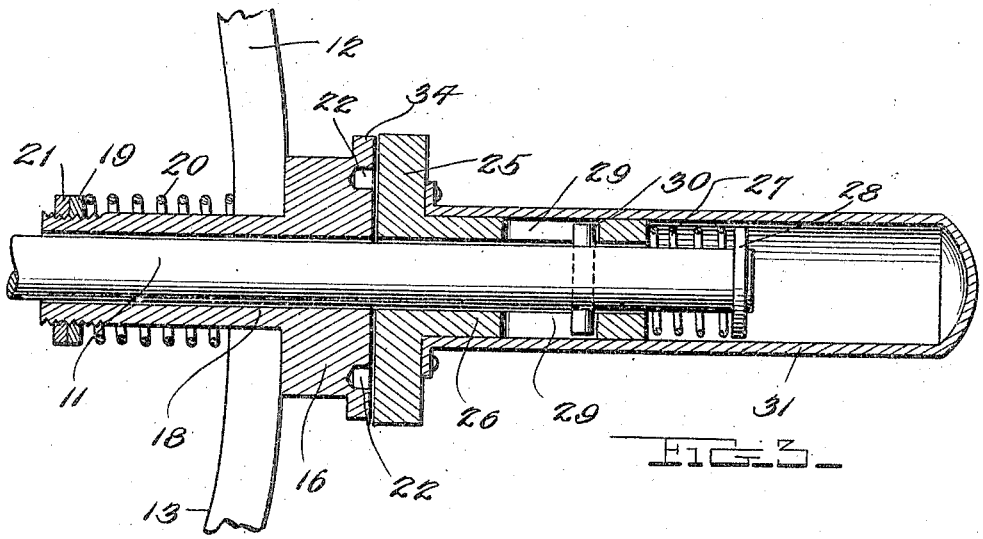
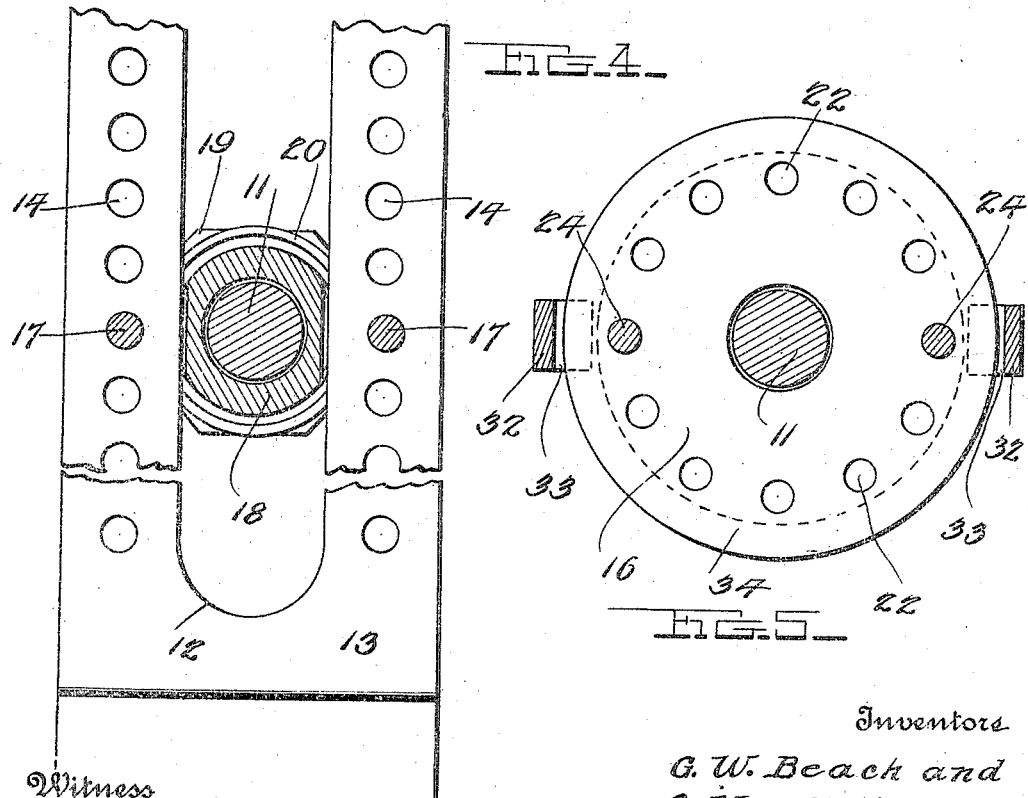
Witness
J. R. Pierce
Inventors
G. W. Beach and
C. Von Culin
By H. R. Williams & Co.
Attorneys

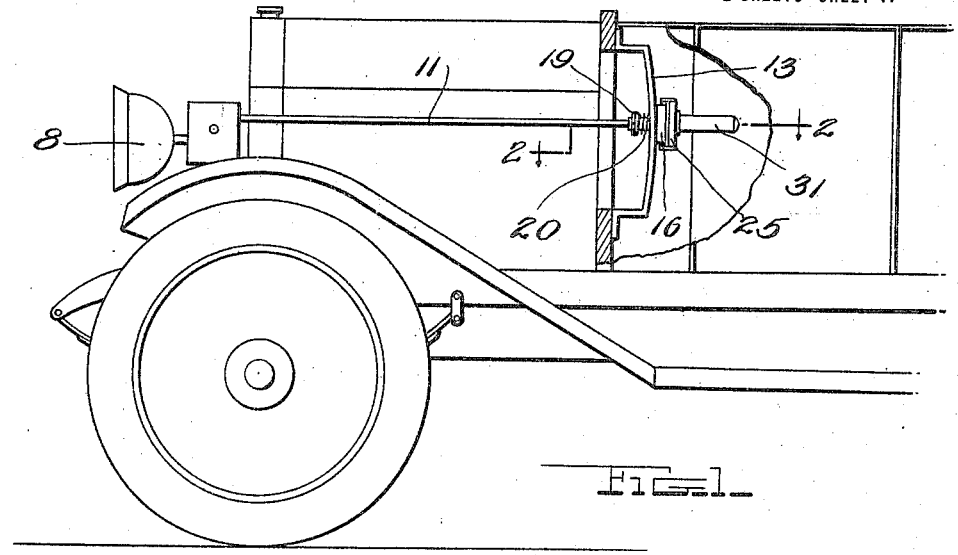
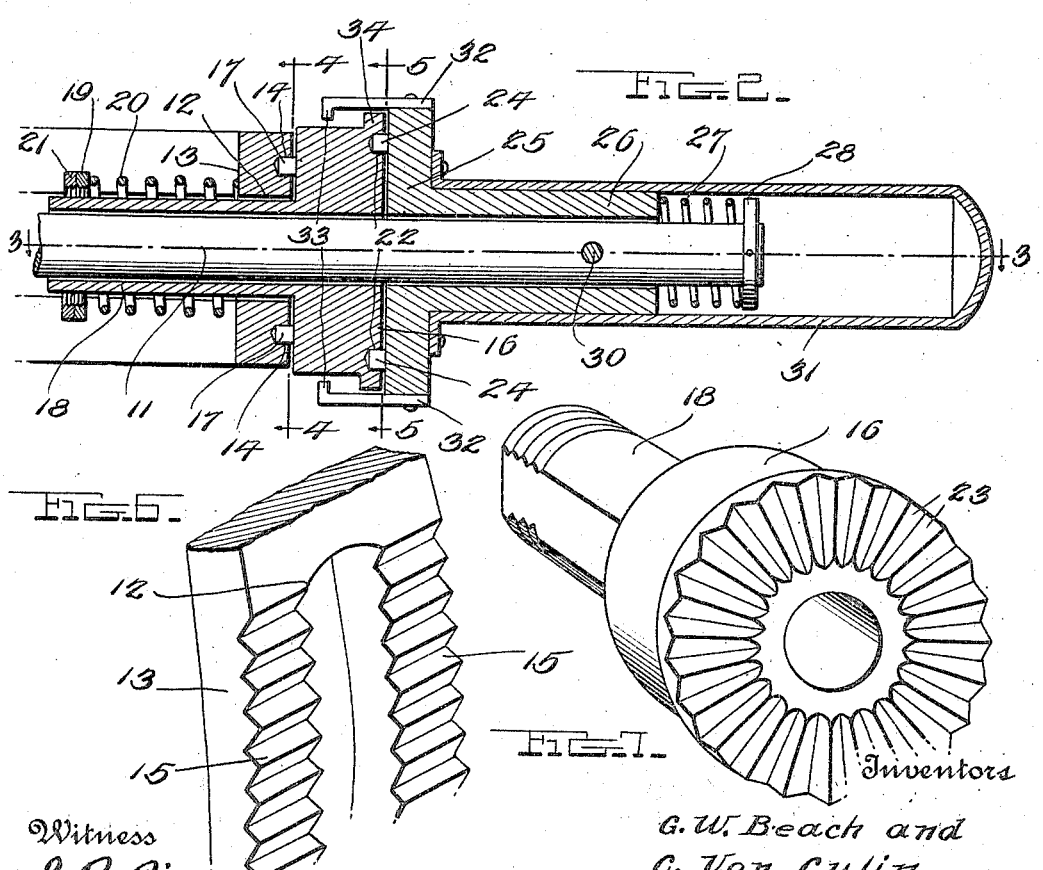

UNITED STATES PATENT OFFICE.

GEORGE WATSON BEACH, OF SAYBROOK, CONNECTICUT, AND CLAYTON VON CULIN, OF NEW YORK, N. Y.

CONTROL FOR DIRIGIBLE HEADLIGHTS AND THE LIKE.

1,234,265.	Specification of Letters Patent.	Patented July 24, 1917.

Application filed October 30, 1916. Serial No. 128,509.

*To all whom it may concern:*

Be it known that we, GEORGE WATSON BEACH, a citizen of the United States, residing at Saybrook, in the county of Middlesex and State of Connecticut, and CLAYTON VON CULIN, a citizen of the United States, residing at New York, in the county of New York and State of New York, have invented certain new and useful Improvements in Controls for Dirigible Headlights and the like; and we do declare the following to be a full, clear, and exact description of the invention, such as will enable others skilled in the art to which it appertains to make and use the same.

Our invention has for its object to provide an improved control and locking means for the control shaft shown in U. S. Patent No. 1,189,512 issued to us July 4, 1916, and to this end the invention resides in certain novel features of construction and in unique arrangements of parts hereinafter fully described and claimed, the descriptive matter being supplemented by the accompanying drawings which constitute a part of this application and in which, Figure 1 is a side elevation of a portion of an automobile with parts broken away and in section, showing the application of the improved features of construction;

Fig. 2 is an enlarged horizontal section on the plane of the line 2—2 of Fig. 1;

Fig. 3 is a vertical longitudinal section on the plane designated by the line 3—3 of Fig. 2;

Figs. 4 and 5 are vertical transverse sections on the planes designated respectively by the lines 4—4, and 5—5 of Fig. 2;

Fig. 6 is a detail perspective view of a portion of the fixed locking member showing a slightly modified form of construction; and Fig. 7 is a similar view of one of the movable locking members likewise disclosed in a different form of construction.

In the drawings above briefly described, the numeral 11 has reference to the control shaft shown in the patent above referred to, this shaft serving when oscillated vertically to tilt the headlights 8 and operating when rotated to swing said lights laterally.

The shaft 11 passes loosely through a slot 12 in a fixed locking member 13 extending transversely of said shaft and secured to any suitable part of the automobile upon which the lights 8 are used. The locking member 13 is preferably in the form of a vertical bar as shown, and this bar may be equipped on opposite sides of its slot with sockets 14 shown in Figs. 2 and 4, or with teeth such as those indicated at 15 in Fig. 6.

A movable locking member 16 is slidably mounted on the shaft 11 and is preferably in the form of a circular plate having suitable projections 17 on one of its faces for engagement with the sockets 14 or the teeth 15, as the case may be. The member 16 is provided with a sleeve 18 which extends through the slot 12 and surrounds the shaft 11, said sleeve having flattened sides for contact with the walls of said slot to prevent rotation of the locking member 16. A nut or other suitable abutment 19 is carried by the free end of the sleeve 18 and a comparatively stiff coiled spring 20 is interposed between said abutment and the fixed locking member 13, and if 19 be in the form of a nut as shown, it will be preferably held against movement by a lock nut 21. As will be obvious, the spring 20 exerts its tension to hold the movable locking member 16 in operative relation with the fixed member 13.

The face of the member 16 opposite that equipped with the projection 17, is formed with an arcuate series of sockets 22 shown in Figs. 2, 3 and 5, or with radially disposed teeth 23 depicted in Fig. 7, and projections 24 on a second movable locking member 25 coöperates with said sockets or teeth. The locking member 25 is shaped similarly to 16 and is provided with a sleeve 26 slidably surrounding the free end of the shaft 11, a comparatively weak coiled spring 27 being interposed between the free end of the sleeve 26 and a suitable abutment 28 on said shaft so that said spring exerts its tension to normally move the locking member 25 into operative engagement with the member 16.

The sleeve 26 may be held against rotation on the shaft 11 in any suitable manner but said sleeve is preferably formed with longitudinal slots 29 through which a pin 30 passes, said pin extending through said shaft.

A prime mover 31 in the form of a tubular handle surrounds the sleeve 26 and is either secured to said sleeve or to the locking member 25, the latter method being preferable, as shown. The handle 31 is adapted to be rotated after first being retracted against the tension of spring 27 sufficiently to disengage the projections 24, this rotation turning the shaft 11 to swing the lights 8 in either direction. When said handle is retracted a greater distance the member 16 will be moved out of engagement with 13 by pick-up means yet to be described, thus permitting the entire shaft to be moved vertically to vary the angle at which the rays of light are presented to the roadway.

The pick-up means previously mentioned may be of any suitable construction, but as shown in the drawings, preferably consists of fingers or the like 32 secured to one of the movable locking members 16, 25 and having abutments 33 for coöperation with another abutment 34 on the other member, said last named abutment being by preference in the form of an annular flange so that as member 25 is retracted, regardless of the amount which this member has been turned, the abutments 33 will be at all times in readiness to strike the flange 34 for the purpose of retracting member 16 when the prime mover or handle 31 is shifted to the necessary extent.

The simple construction previously described is obviously of great advantage for the purpose for which it is primarily designed and for use in other connections if found desirable. Furthermore, it is extremely inexpensive to manufacture and to market, and may be operated with ease.

For these reasons, the construction shown is preferable, but it is to be understood that within the scope of the invention as claimed numerous changes may be made without sacrificing the principal advantages.

We claim:—

1. The combination of a control member operative either when rotated or when moved in another manner, means for locking said control member against movement in either manner, and a prime mover for releasing said locking means and for moving said control member in either manner.

2. The combination of a control member operative either when rotated or when moved in another manner, fixed and movable locking members for holding said control member against movement in the last named manner, and a second movable member coöperating with the other to lock said control member against rotation.

3. The combination of a control member operative either when rotated or when moved in another manner, fixed and movable locking members for holding said control member against movement in the last named manner, a second movable locking member coöperating with the other to lock the control member against rotation, and a prime mover for releasing said movable locking member and for moving the control member in either manner.

4. The combination of a control member operative either when rotated or when moved in another manner, fixed and movable locking members for holding said control member against movement in the last named manner, a second movable locking member coöperating with the other to lock the control member against rotation, and a prime mover for successively releasing the second and first named movable locking members and for operating the control member after releasing either.

5. The combination of a control member operative either when rotated or when moved in another manner, a pair of movable locking members for holding said control member against movement in either manner, a prime mover for releasing the rotation preventing member when shifted, and pick-up means carried by one locking member for releasing the other when said prime mover is further shifted.

6. The combination of a control member operative either when rotated or when moved in another manner, a pair of movable locking members for holding said control member against movement in either manner, a prime mover for releasing the rotation preventing member when shifted, and a pick-up device carried by one locking member for releasing the other member when the prime mover is further shifted, said last named member and said pick-up device having coacting abutments.

7. The combination of a control shaft operative either when rotated or moved laterally, a pair of locking members slidable on said shaft for holding it against movement in either manner, a handle connected with the rotation preventing member, a comparatively weak spring for holding this member in operative position, a comparatively strong spring for holding the other member in operative position, and pick-up means carried by one of said locking members for releasing the other when the handle is shifted sufficiently.

8. The combination of a control shaft operative either when rotated or shifted laterally, a fixed locking member having a slot through which said shaft passes, a movable locking member slidable on said shaft and coöperating with said fixed member to prevent lateral movement of said shaft, said movable member having a flattened sleeve passing through said slot and surrounding the shaft to prevent said member from rotating, a spring mounted on said sleeve and bearing against the fixed locking member to hold the movable member in operative relation thereto, a second movable locking member mounted slidably but non-rotatably on the shaft for coöperation with the other movable member to lock said shaft against rotation, a comparatively weak spring surrounding the shaft for forcing said second movable member into engagement with the first, a handle connected to said second movable member, and means for shifting the first named movable member to inoperative position when the second member is shifted a predetermined amount.

9. The combination of a control shaft operative either when rotated or shifted laterally, a fixed locking member having a slot through which said shaft passes, a movable locking member slidable on said shaft and coöperating with said fixed member to prevent lateral movement of said shaft, said movable member having a flattened sleeve passing through said slot and surrounding the shaft to prevent said member from rotating, a spring mounted on said sleeve and bearing against the fixed locking member to hold the movable member in operative relation thereto, a second movable locking member mounted slidably but non-rotatably on the shaft for coöperation with the other movable member to lock said shaft against rotation, a comparatively weak spring surrounding the shaft for forcing said second movable member into engagement with the first, a handle connected to said second movable member, and pick-up means carried by one movable member for moving the first named movable member into inoperative position when the other member is moved sufficiently.

10. The combination of a control member operative when moved in either one of two ways, a pair of movable locking members for holding said control member against movement in either manner, and means for releasing said members successively including a prime mover connected to one of said members.

11. The combination of a control member operative when moved in either one of two ways, a pair of movable locking members for holding said control member against movement in either manner, pick-up means carried by one member for releasing the other, and a prime mover connected to said one member.

In testimony whereof we have hereunto set our hands in the presence of two subscribing witnesses.

GEORGE WATSON BEACH.
CLAYTON VON CULIN.

Witnesses:
FREDERICK B. BLACKMAN,
W. E. JAMES.

Copies of this patent may be obtained for five cents each, by addressing the "Commissioner of Patents, Washington, D. C."